May 9, 1967     B. M. FABUSS ETAL     3,318,667
MICRO COKER
Filed Sept. 6, 1963     3 Sheets-Sheet 1
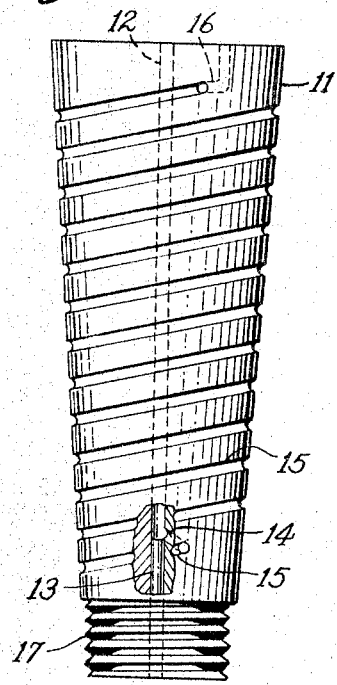
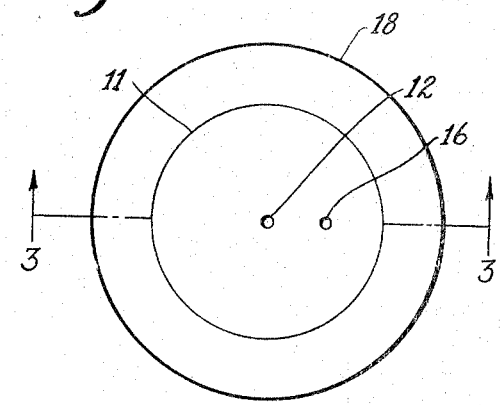
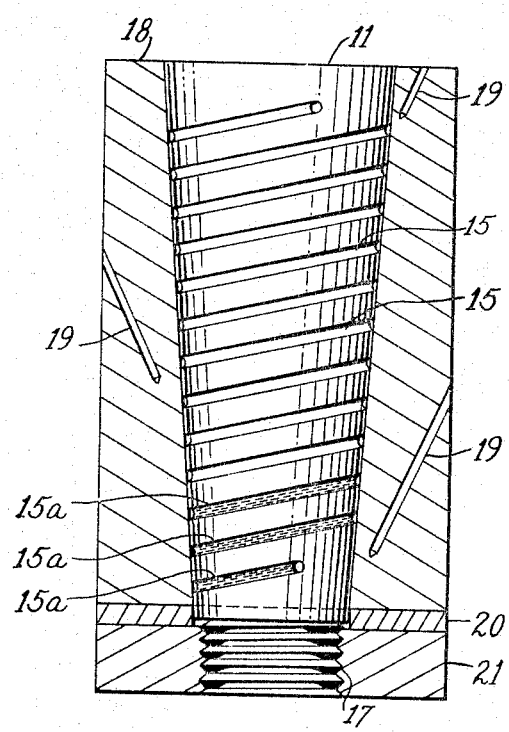
Inventors
Bela M. Fabuss
Sandor Borsanyi
By their Attorney May 9, 1967  B. M. FABUSS ETAL  3,318,667
MICRO COKER Filed Sept. 6, 1963  3 Sheets-Sheet 2

May 9, 1967 B. M. FABUSS ETAL 3,318,667
MICRO COKER
Filed Sept. 6, 1963 3 Sheets-Sheet 3

United States Patent Office 3,318,667
Patented May 9, 1967

3,318,667
MICRO COKER
Bela M. Fabuss, Brookline, and Sandor Borsanyi, Marblehead, Mass., assignors to Monsanto Research Corporation, St. Louis, Mo., a corporation of Delaware
Filed Sept. 6, 1963, Ser. No. 307,238
7 Claims. (Cl. 23—253)

This invention relates to test equipment, and more particularly, provides equipment for testing thermal stability of hydrocarbon fuels, particularly high-temperature stability of fuels for high-performance aircraft.

In high-performance aircraft such as supersonic transport airplanes, the fuels are exposed to thermal stresses substantially greater than those present in the lower-speed aircraft, such as those using reciprocating piston engines. Lack of thermal stability in fuels employed in jet and other high-performance aircraft has been found to result in coke deposits which plug critical orifices.

A fuel coker has been developed to provide test equipment for evaluating the tendency of hydrocarbon fuels to deposit carbon and coke on exposure to elevated temperatures, and predicting fuel performance in aircraft engines exposing the fuel to thermal stress. This is the ASTM-CRC Fuel Coker, described in ASTM Method of Test for Thermal Stability of Aviation Turbine Fuels, No. D 1660–61 T. In this test equipment, fuel is pumped at predetermined rates through a preheater section simulating the hot fuel line sections of an engine such as an engine fuel-oil cooler. It then passes through a heated filter section representing the nozzle area or small fuel passages in the hot section of the engine where fuel degradation products may become trapped. As degradation products build up in the filter, an increased pressure drop across the filter is noted, which in combination with the deposit condition of the preheater, is used as an assessment of the thermal stability of the fuel.

The preheater unit consists of two tubes, mounted concentrically. A cartridge type heater is inserted inside the inner tube, which heats the fuel as it passes through the annular passage between the two concentric tubes. At the end of the test, the deposit condition of the inner preheater tube is rated on a scale of 0 to 5, by comparison to a color standard consisting of a series of sample panels.

The ASTM-CRC Fuel Coker is extremely valuable, inasmuch as the correlation between the fuel coker results and actual performance in aircraft has been established in a flight test program. However, this test equipment is not wholly satisfactory.

While the filter pressure drop is a quantitative, repeatable measurement of a numerical value, the preheater deposit ratings, made using comparison standards, are only qualitative or semi-quantitative. The appearance of the deposits can vary considerably, for example in the color of the deposits and in their distribution, and the instructions required for making the ratings are prolonged and complicated. Also, the preheater tubes are relatively expensive, and after the deposit rating has been established, the preheater tube is normally cleaned off and reused. Thus, there is no convenient means available for preserving an actual sample of the deposit produced, for future reference and comparison with subsequent test results.

Moreover, the ASTM-CRC Fuel Coker uses a 150 p.s.i. fuel system pressure, and the effects of fuel volatility make it necessary then to limit preheater temperatures to approximately 350° F. to 450° F. The normal desired fuel flow rate is approximately 6 pounds per hour, and the test duration about 5 hours, which means that a large fuel sample must be available to make the test applicable, amounting to about five gallons.

The limitations on the pressures and temperatures attainable in this test equipment do not permit evaluations of fuels under conditions now contemplated for high performance aircraft. Under supersonic flight conditions, for example, fuel in the tanks is expected to be heated excessively by the high stagnation temperatures surrounding the airframe. In short residence time heating which may be expected in critical engine components, temperatures up to 750° F. or higher may be reached. Moreover, to provide fuels capable of achieving the high performance expected of Mach 3 supersonic transport, for example, studies are being undertaken of fuel materials such as pure individual hydrocarbons, of which available samples may be considerably smaller than the 5 gallon test requirement of the ASTM-CRC Fuel Coker.

Various attempts have been made to provide test equipment for use where the ASTM-CRC Fuel Coker cannot be employed. Heating fuels in a bomb-type vessel has been proposed, but found unsatisfactory: to parallel engine conditions, equipment is needed in which the fuel coking tendencies are measured using a flowing stream, under dynamic, rather than static conditions. The dynamic testers which have received attention have been generally of the same design as the ASTM-CRC coker, but modified with accessory equipment permitting operation at more elevated temperatures and pressures, providing for recycling the fuel to allow operation with small samples, and so forth. To answer problems of sample size limitations, it has also been proposed that a reduced scale model of the ASTM-CRC coker be used. However, all of these test cokers employ the same kind of preheater arrangement as the ASTM-CRC coker, with the fuel passing through an annular passage between concentric tubes, and thus fail to provide any more satisfactory rating method than the original design.

In accordance with this invention, there is now provided a fuel test coker which requires only a small volume of sample, provides a quantitative measure of the coking properties of the fuel, and in a particularly preferred embodiment, provides a permanent record of the coke deposition exhibited by a fuel under thermal stress.

Essentially, the stated objectives are attained by providing equipment consisting of
a substantially solid, massive, pressure-tight body
(1) made up of at least two separable members
(2) and penetrated by a hollow tubular continuous passageway
(a) connecting inlet and outlet openings in said body
(b) and positioned between contiguous faces of said separable members over at least the major portion of its length (3) and having means for joining said separable members together to form said substantially solid pressure-tight body.

The invention will be more clearly understood from a consideration of the drawings, in which FIGURE 1 is a side elevational view, partly in section, of the inner member of a cylindrical embodiment of the micro coker of the invention;

FIGURE 2 is a top plan view of the assembled cylindrical micro coker embodiment of the invention;

FIGURE 3 is a cross-sectional view taken along line 3—3 in FIGURE 2, of the assembled cylindrical micro coker, showing the appearance of the inner member after a test run;

Figure 4:
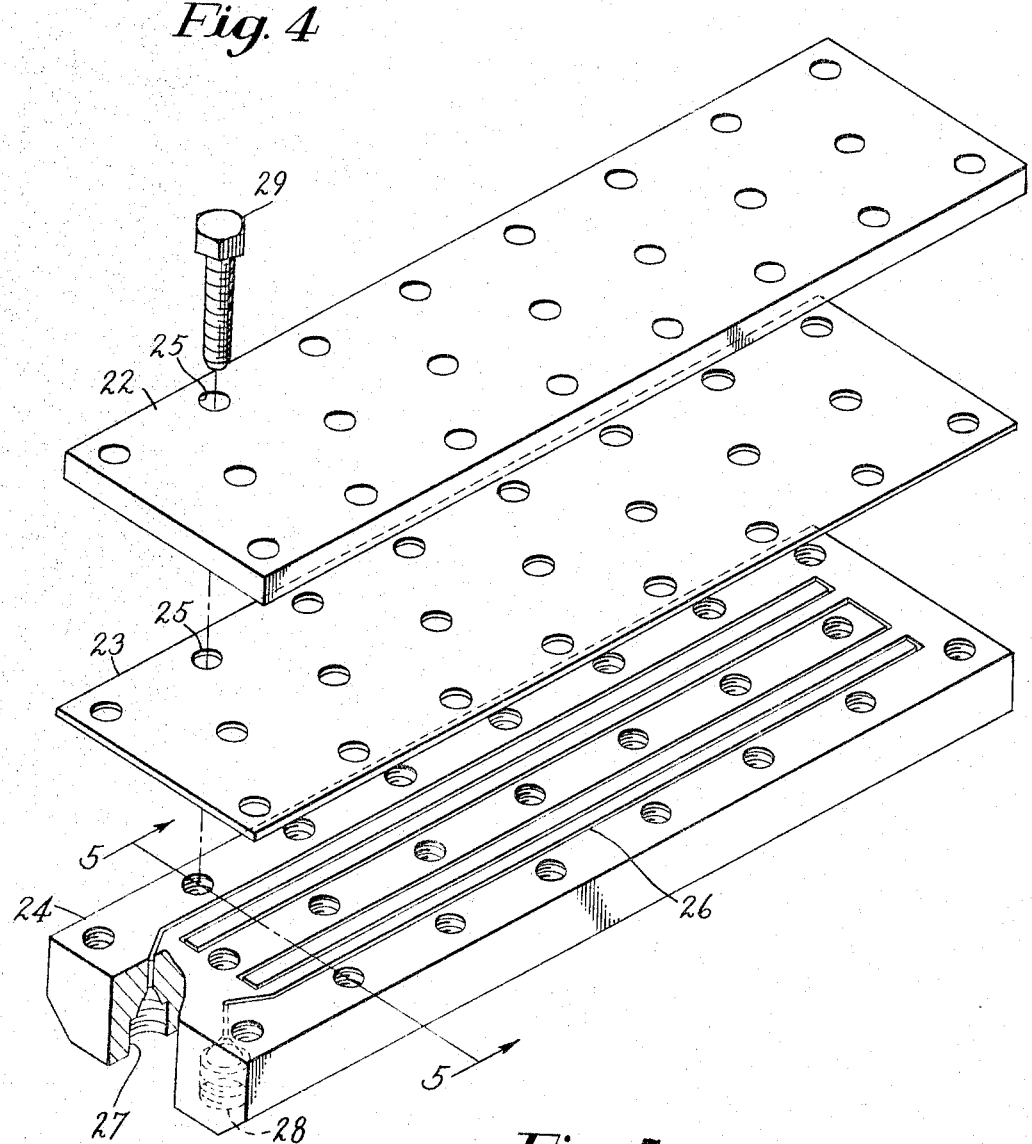
FIGURE 4 is an exploded perspective view, partly in section, of a flat micro coker embodiment of the invention.
Figure 5:
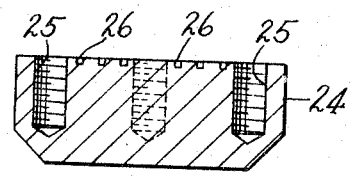
FIGURE 5 is a cross-sectional view, taken along line 5—5 in FIGURE 4, of the lower plate of the micro coker assembly shown in FIGURE 4.
Figure 6:
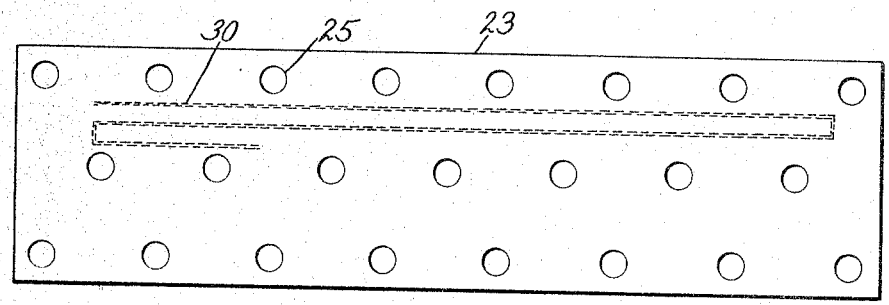
FIGURE 6 is a plan view of a face of the center panel of the micro coker assembly illustrated in FIGURE 4, showing the appearance of the panel face after a test run.

In operation, assembly of the separable members of the cylindrical fuel micro coker illustrated in FIGURES 1-3 or of the flat micro coker illustrated in FIGURES 4-6 produces substantially continuous, pressure-tight contact of a grooved member with a cover member, covering the groove and thereby converting it to a closed, continuous passageway from an inlet to an outlet opening in the assembled body.

The assembly having the interior fuel passageway is placed in an exterior chamber in which it can be pressurized and heated to temperatures exemplary of those which may be encountered in high-performance aircraft. Generally, the pressure applied is such as to maintain the fuel in the liquid state at the temperatures employed. The fuel is metered into the inlet of the passageway, and proceeds along the passageway, finally exiting through the outlet. At elevated temperatures, unstable fuels decompose and deposit coke while proceeding through the passageway. This leaves a coke deposit in the passageway, blackening the grooves and walls forming the passageway.

In the cylindrical micro coker illustrated in FIGURES 1 through 3, the micro coker is made up of a tapered cylindrical inner member 11 having a spiraling continuous groove 15 on its surface connecting an inlet opening 12 to an outlet opening 16, and a cylindrical hollow outer member 18 which has a tapered cylindrical hollow interior into which the inner member fits snugly. Disassembly of the micro coker body after a test run, by unscrewing and taking out the inner member, permits the grooves to be inspected. Counting the number of grooves blackened by coke deposition gives a numerical value for the coking tendency of the fuel under the test conditions.

In the flat fuel coker illustrated in FIGURES 4-6, the assembly consists of a relatively thick top plate 22, a relatively thin center panel 23 and a relatively thick bottom plate 24, with the bottom plate having a continuous groove 26 cut in its face, joining an inlet 27 to an outlet opening 28 in this portion of the body. The top plate, center panel and grooved bottom plate are each penetrated by threaded holes 25, 25 into which bolts are screwed to hold the assembly in pressure-tight contact. On completion of a test, when the micro coker is disassembled by removing the bolts, the coke deposition pattern appears on the grooves of the lower plate 24, and also appears on the face of the center panel adjacent to the grooved surface of the bottom plate during the test. If desired, the number of blackened grooves or the lines above the groove resulting from coke deposition on this center panel can be used as a numerical rating for fuel thermal stability in the test; or ratings can be stated as the length of the fuel path which is discolored. In any case, however, the relatively thin center panel, being inexpensive to produce, can readily be replaced in each new test. Thus, the panels resulting from each test with each fuel can be preserved conveniently as a precise record of the results of the test.

The latter arrangement has the particular advantage, moreover, of providing a convenient means for varying the materials of construction in contact with the fuels during the thermal stability tests. In fuel cokers having an annular passageway for the fuel like the above-discussed ASTM-CRC Fuel Coker preheater, concentric about a tube enclosing the heating means and having a surface which is inspected to rate the fuel for deposition production, the tube must have a certain structural strength, to support being cleaned and polished to provide a reuseable surface in the next test, for example. In the three-part assembly of FIGURES 4-6, the exterior plates forming the exterior of the assembly provide the structural strength of the body. The middle panel is supported, and thus may be relatively thin and weak. Also, only a relatively simple shape needs to be fabricated for the test. Thus the effects of different materials of construction, such as aluminum, stainless steel, mild steel or the like, can be conveniently and readily tested.

The passageway in the various embodiments of the fuel coker of the invention will have at least a major portion of its length situated between contiguous faces of separable members, so that at least most of the coke deposition produced by a test fuel will be open to view on separation of the members. Preferably the portion of the passageway positioned between the separable members has an undulating, serpentine configuration, to prolong the path followed by the fuel in this portion of the passageway. Especially advantageously, to allow for a numerical coke deposition rating related to a numerical measure of the length of the passageway blackened in a test run, the undulating course of the passageway will be such that equidistant points along the length of the passageway occur at spaced intervals on a straight line traversing a face of a member contacting the passageway. For example, an imaginary straight line vertically up the side wall of the inner member of a cylindrical coker as illustrated in FIGURE 1 cuts the groove spiralling around the cylinder at approximately equidastant intervals along the length of the groove, when the turns of the groove are approximately equidistantly spaced on the face of the member. Thus a count of the number of grooves showing signs of coke deposition gives the desired numerical rating. In the flat micro coker of FIGURE 4, the groove follows a course back and forth on the face with crossing path lengths which are about equal, to achieve a similar relationship of the length of each successive crossing to the total length of the path covered; and if desired, alternative courses for this path can be adopted to give a still more even distribution of the path length about a central line. Particularly with the flat micro coker, measurement of the length of the groove which is discolored also provides a convenient measure of the coking tendencies of various fuels.

Figure 7:
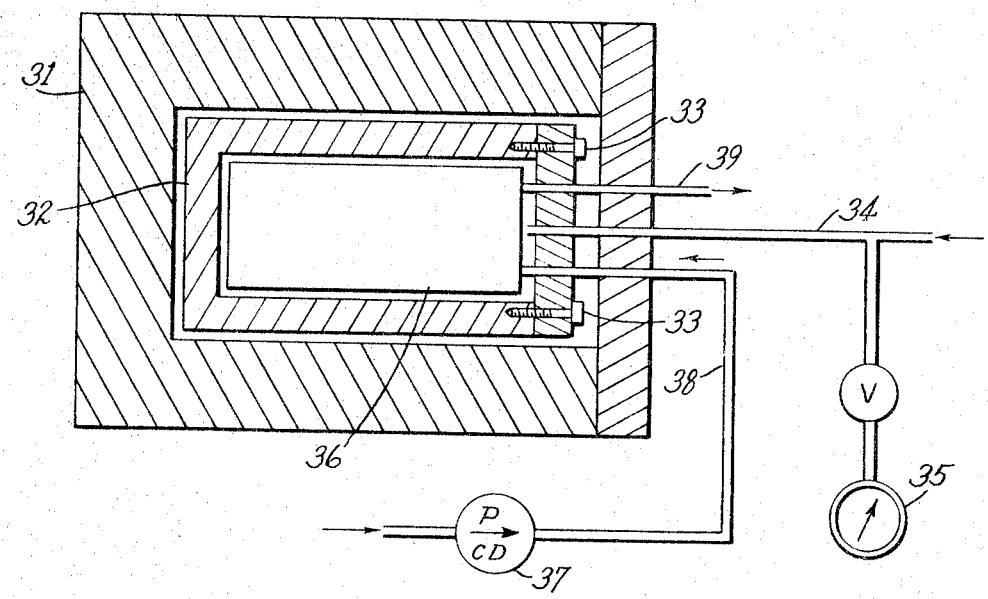
FIGURE 7 is a diagrammatic sectional view of equipment for operation of a test fuel coker of the invention.

It will be appreciated that with the above-described designs, having a passageway formed by the juxtaposition of separable members at least over most of its length, the fuel coker body can be made massive and pressure-tight, and retain structural strength up to elevated temperatures, while the passageway can be kept very small in diameter compared to the total size of the coker body. Thus the presently provided fuel coker is especially adapted for use in tests on small samples of fuel under severe stress conditions. For example, the present micro coker can be employed with fuel temperatures ranging from, say, a test temperature as low as 300° F. to one as high as 1000° F. or even above, and involving superatmospheric pressures, evolved by heating the fuels to these temperatures, ranging as high as 1500 pounds per square inch gauge (p.s.i.g.): with the coker enclosed during operation in an externally pressurized chamber, as shown in FIGURE 7, for example, only the pressure difference between inside and outside need be resisted by the pressure-tight body, in any case. With a small diameter passageway, low flow rates such as 1–50 milliliters (ml.) per hour can be used, and useful test ratings obtained in periods as low as one hour, from which it will be evident that very small samples, such as those available of pure synthetic and exotic hydrocarbons, are amenable to test in the present equipment.

Use of an external pressure chamber may sometimes be omitted, for example when the micro coker is provided with appropriate gasketing such as a strip of a metal like aluminum, which expands more than the body of the coker on heating, surrounding the grooves.

Also, the equipment can if desired be scaled up to permit obtaining the advantages of this equipment, such as a panel exhibiting deposit formation which is conveniently retainable for record purposes, in tests involving larger fuel samples.

Further, in the flat micro coker embodiment, both exterior plates can be channelled by grooves contacted by the center panel, providing a double passageway through the equipment, through which separate flow streams may be circulated, as in a heat exchanger.

Referring now in more detail to the micro coker of this invention:

FIGURE 1 is an elevational view of the inner member 11 of a cylindrical fuel coker of the invention. A central inlet opening 12, shown by dotted lines, runs through the center of this member. It is closed off at the bottom by a plug 13, which is removable to permit reaming out the central opening to clean it if it gets plugged by coke particles. Just above the plug 13, a branch 14 of the inlet opening leads to the outside of the member, connecting to the beginning of a continuous groove 15 spiralling around the outside of the member. At the other end of groove 15, an outlet opening 16 provides an exit path from the groove through the interior of the member out to its top face. The member 11 has screw threads 17 cut in its lower end, by which it is fastened securely to the outer member of the assembly as shown in subsequent figures.

FIGURE 2 is a top plan view of the assembly of the inner member 11 of FIGURE 1 with the outer member 18 of the cylindrical fuel coker embodiment of the invention. Inlet opening 12 and outlet opening 16 are seen in the top of inner member 11.

FIGURE 3 is a cross-sectional view, taken along line 3—3 of FIGURE 2, of the assembled cylindrical fuel coker of the invention. Inner member 11 is assembled inside outer member 18. Outer member 18 is penetrated by wells 19, 19 for introduction of thermocouples. A metal washer 20 and nut 21 are turned down on the threads 17 of the inner member 11 to tighten the inner member snugly into the hollow interior of outer member 18. The outside of inner member 11 contacts the inside hollow interior of outer member 18 substantially continuously, except above the grooves 15, so that the grooves 15 are closed in by the walls of the hollow interior of outer member 18 forming a continuous hollow passageway spiraling about inner member 11.

In FIGURE 3, the lower grooves 15a, 15a are lined to indicate the darkened and blackened appearance which a series of the grooves assumes after a fuel coking test, as a result of coke deposition in the grooves. Rating of extent of coke deposition can be made as a count of the number of grooves blackened, as explained above.

FIGURE 4 is an exploded perspective view, partly in section, of a flat fuel coker embodiment of the invention. Top plate 22, center panel 23 and bottom plate 24 each have flat faces and are penetrated by superimposable holes 25, 25. A continuous groove 26 on the interior face of lower plate 24 connects inlet opening 27 to outlet opening 28. These openings, 27 shown by dotted lines, and 28 shown partly in section, open to the exterior of bottom plate 24. Bolts as illustrated by bolt 29 are put through each of the holes 25 to fasten the plates 22 and 24 in face-to-face contact with the panel 23 forming a single, pressure-tight body on assembly of the unit. In the assembled unit, a face of center panel 23 is in substantially continuous contact with the contiguous face of lower plate 24, except above groove 26, for which it provides a closure so that the space bounded by groove 26 and the contiguous face of panel 23 forms a continuous closed passageway between inlet opening 27 and outlet opening 28.

FIGURE 5 is a cross-sectional view of plate 24 along line 5—5 of FIGURE 4, in which it is seen that the holes 25, 25 between the path of the groove 26 are threaded to receive a bolt.

FIGURE 6 is a plan view of the face of panel 23 showing its appearance after a test, with coke deposition lines 30 appearing along part of the path which was above the groove on lower plate 24 during the test, while the unit was assembled.

FIGURE 7 is a diagrammatic sectional view of equipment for operation of a test coker of the invention (either the embodiment of FIGURE 1–3 or that of FIGURES 4–6). An external furnace 31, wired for temperature control and sensing (not shown), contains an internal pressure chamber 32, bolted closed with bolts 33, 33, which is pressurized through line 34 with an inert gas such as nitrogen, with the pressure measured by gauge 35. The pressure in the pressure chamber 32 surrounding the micro coker 36 should generally be an amount sufficient to equalize the internal pressure generated by heating the fuel to the selected temperature within the micro coker. The pressure chamber 32 contains a micro coker of this invention 36, which is fed, from a variable capacity fuel pump 37, through feed line 38, with test fuel from a reservoir (not shown). The fuel, after circulating through the micro coker 36, exits through outlet line 39 to pressure-control equipment (not shown).

It will be appreciated that the illustrated equipment can be employed in conjunction with other accessory apparatus which has been found useful in fuel coker tests, such as "pre-soak" reservoirs, in which the fuel is held for prolonged times at elevated temperatures comparable to expected storage tank temperatures, prior to being raised to coking temperatures; a filter which catches coke particles suspended in the fuel exiting from the coker, which may be equipped to measure pressure drop across the filter due to plugging by such particles; and so forth.

In an exemplary embodiment of the invention, a cylindrical micro coker was made of No. 347 stainless steel. The outside shell had an external diameter of 1.44 inches and a height of 3.8 inches. The inner member had a top diameter of 1.06 inches at the widest point, and at the bottom of the tapered part, where it became a right cylinder provided with screw-threading, had an outside diameter of 0.94 inch. The depth of the groove spiralling around the inner member, measured from the top face to the lowest point of the groove, was 0.038 inch. The groove had a semi-circular cross-section, and the width across the open face of the groove was 0.042 inch. The groove length was 44.4 inches, and the groove made 13 turns around the outside face of the member between inlet and outlet.

The micro coker was enclosed in a 500 cc. capacity high pressure vessel, with the system pressurized to 5 p.s.i.g. above the operating pressure by a nitrogen line, and the pressure vessel was surrounded by a heated furnace. The temperature of the micro coker was recorded and the temperature profile along the coker was found to be uniform: the temperature variation was 5–8° F. at 650° F.

Fuel exiting from the coker was analyzed to detect decomposition (cracking). The condition of the grooves was rated using the ASTM-CRC Fuel Coker scale, to provide correlation with this well-known coker.

The following table presents results of a series of runs:

| Fuel Material | Temp., °F. | Flow rate, ml./hr. | Running time, hr. | Percent Cracked | Rating |
|---|---|---|---|---|---|
| Cetane | 1,000 | 24 | 2 | <1 | 1, 2. |
| Do | 1,000 | 12-6 | 1 | 50-92 | 3, 4. |
| Do | 500 | 3 | 2 | <1 | No change. |
| Do | 750 | 3 | 2 | 0.8 | 2, 3. |
| Do | 850 | 3 | 2 | 29.7 | 3, 4; coke, 3 turns. |
| JP-6* | 650 | 3 | 1 | <1 | No change. |

*Military Specification MIL-F-25656B.

As will be seen from the foregoing, at a 3 ml./hour fuel flow rate, using cetane fuel, at 500° F. no cracking of the fuel or discoloration occurred. At 750° F., about 1% thermal decomposition took place and a color change of the grooves became apparent: the last two grooves of the reactor had a bronze color corresponding to a preheater color rating of 3 in the ASTM-CRC Fuel Coker preheater rating scale. As the temperature was raised to 850° F., with the same flow rate, the percentage of cracked cetane increased to 30%. For cetane, at the 850° F. temperature, the ASTM-CRC Fuel Coker gives a CRC 4 rating. In the micro coker, it was found that the first five turns of the groove beyond the inlet were CRC rating 3, the next five CRC rating 4, and last three showed coke deposition.

For construction of the flat micro coker embodiment of the invention, type 304 stainless steel was used. The groove on the lower plate was rectangular in section, had a depth of 0.036 inch and a width of 0.046 inch, and was 38.4 inches long. The base of the micro coker on which the groove was cut was 2 inches wide and 7.5 inches long, with 2 rows of eight holes, ¼ inch diameter, and 1 center row of 7 holes serving as means to bolt this part to the upper panel and plate. Flat panels of aluminum, stainless steel, or mild steel, 2 mils thick, and a steel cover plate with the same dimensions as the upper face of the lower plate, 7 and ½ inch by 2 inches, perforated with holes permitting the bolting together of the assembly, were provided.

Fuel was fed into the coker through an 0.041 inch I.D. stainless steel hypodermic tube, with the feed line joined to the body of the coker by high-pressure fittings. The coker was enclosed in a pressure vessel and pressurized with nitrogen, with the pressure vessel enclosed in a furnace.

After the run, the panel was removed, and the imprint of the test grooves on the panel evaluated either by a color comparison or by weighing the amount of carbon deposit. The panels were retained to provide permanent records of the fuel evaluation test results.

A fuel employed in runs made in this flat micro coker was a high performance, high temperature fuel designated HTF 157–60 and characterized by the following properties:

API gravity 47.5.
Smoke point 32 mm.
Volume percent aromatics 5.
Bromine No. 0.02.
Gum (existent) 3 mg./100 ml.
Weight percent sulfur 0.005.
Weight percent mercaptan S nil.
Freeze point −27° F.
ASTM distillation: 10%, 424° F.; 50%, 446° F.; 90%, 475° F.; end point 508° F.

With a feed rate of 3 ml. per hour and 500 p.s.i.g. pressure on a panel made of No. 302 stainless steel, in the temperature range from 650° to 850° F. there was a linear correlation between temperature and deposit length: about 1 inch at 650°, 5 inches at 750° and about 9 inches at 850°. Using aluminum test panels, the increase in deposit length with temperature was about seven times greater, but the first appearance of deposits occurred at a much higher temperature.

Whereas the aluminum and type 302 stainless steel panels exhibited grey-black deposits, type 304 stainless steel test panels produced a variety of deposits comparable to the ASTM-CRC Fuel Coker preheater tube deposits. Tests made on a number of fuels at 500 p.s.i.g., 750° F. and 3 ml. per hour flow rate gave panel appearances ranking the fuels in the same comparative order of stability as the ASTM-CRC Fuel Coker ratings.

While the invention has been described with particular reference to specific preferred embodiments thereof, it is to be appreciated that modifications and variations can be made without departing from the scope of the invention, which is limited only as defined in the appended claims.

What is claimed is:

1. Improved fuel coker equipment for measuring the coking characteristics of a fuel comprising in combination:
    (a) a substantially pressure-tight body for pyrolyzing a fuel and which comprises at least two separable members penetrated by a hollow tubular continuous passageway connecting inlet and outlet openings, said passageway being formed by covering a groove in at least one said members with the other members to form a passageway positioned between the contiguous faces of said separable members and defining an undulating serpentine course having connected segments extending over at least the major portion of the length of said body,
    (b) means for joining said separable members together to form a substantially solid pressure-tight body constructed to remain pressure tight at elevated temperatures,
    (c) means to introduce a fuel to said body, and
    (d) means to heat said body to temperatures sufficient to pyrolyze said fuel.

2. The fuel coker equipment of claim 1, wherein said members are substantially rectangular and said passageway defines an undulating, serpentine course connecting inlet and outlet openings said course comprising a plurality of connected segments extending in reciprocal fashion over at least the major portion of the length of said body with the central axis perpendicular to the length of said body dividing each connected segment into equivalent lengths.

3. The fuel coker equipment of claim 1 wherein said passageway is defined over most of its length by a channel cut in an interior face of a first of said separable members and the surface of a contiguous interior face of a second of said separable members above said channel and the said face of said second member continuously contacts said interior face of said first member except in the space above said channel.

4. The fuel coker equipment of claim 1, wherein said separable members consist of a hollow cylindrical member and a substantially solid cylindrical member, the hollow of said hollow member is conical in shape over a major portion of its length, the external face of said solid member is contoured to contact and mate with the interior face of said hollow member, and a curved serpentine groove cut on the external face of said solid member connecting to inlet and outlet openings in said solid member, the fit of said solid member within said hollow member being such that on assembly of said members one within the other, the contiguous surfaces of said members are in substantially continuous contact, except above said channel, and the interior surface of said hollow member and the walls of said channel define a passageway connecting said inlet and outlet openings.

5. The fuel coker equipment of claim 4 in which said serpentine groove follows a spiral course about the exterior of said solid body.

6. The fuel coker equipment of claim 1, consisting of top and bottom plates each having a flat interior face of substantially the same dimensions, and a flat relatively thin center panel, in which said passageway is defined by a flat surface of said panel abutting a channel on an interior face of one of said plates, connecting inlet and outlet openings at the exterior of the plate.

7. Improved fuel coker equipment for measuring the coker characteristics of a fuel comprising in combination:
  (a) a substantially pressure-tight body for pyrolyzing a fuel and which consists of top and bottom rectangular plates each having a flat interior face of substantially the same dimensions, one of said plates having a channel on said interior face defining an undulating serpentine course connecting inlet and outlet openings at the exterior face of said plate, said course comprising a plurality of connected segments extending in reciprocal fashion over at least the major portion of the length of said interior face with the central axis perpendicular to the length of said rectangular plate dividing each connected segment into equivalent lengths, a flat relatively thin panel positioned between said plates to thereby form a hollow, continuous passageway between the flat surface of said panel above said channel,
  (b) means for joining said separable members together to form a substantially solid pressure-tight body constructed to remain pressure tight at elevated temperatures,
  (c) means to introduce a fuel to said body, and
  (d) means to heat said body to a temperature sufficient to pyrolyze said fuel.

References Cited by the Examiner

UNITED STATES PATENTS

| 532,085 | 1/1895 | Murray et al. | 18—12 |
| 2,093,652 | 9/1937 | Widmer et al. | 264—176 X |
| 3,074,627 | 1/1963 | Goetz | 73—61 X |
| 3,149,941 | 9/1964 | Barnitz et al. | 73—23.1 X |

FOREIGN PATENTS 1,055,903  10/1953  France.

OTHER REFERENCES

ASTM Standards, D1660–61 T, Part 7, Petroleum Products and Lubricants, pp. 870–891 (1961).

MORRIS O. WOLK, *Primary Examiner.*
JOSEPH SCOVRONEK, *Examiner.*